(12) United States Patent
Ter Weeme et al.

(10) Patent No.: US 11,871,498 B2
(45) Date of Patent: Jan. 9, 2024

(54) DETERMINING A REACHABILITY OF AN ELECTRONIC DEVICE OVER MULTIPLE WIRELESS COMMUNICATION PROTOCOLS

(71) Applicant: SIGNIFY HOLDING B.V., Eindhoven (NL)

(72) Inventors: Berend Jan Willem Ter Weeme, Eindhoven (NL); Hugo Jose Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 177 days.

(21) Appl. No.: 17/428,701

(22) PCT Filed: Feb. 10, 2020

(86) PCT No.: PCT/EP2020/053259
§ 371 (c)(1),
(2) Date: Aug. 5, 2021

(87) PCT Pub. No.: WO2020/165070
PCT Pub. Date: Aug. 20, 2020

(65) Prior Publication Data
US 2022/0117064 A1    Apr. 14, 2022

(30) Foreign Application Priority Data

Feb. 14, 2019 (EP) .................................. 19157113

(51) Int. Cl.
*H05B 47/18* (2020.01)
*H05B 47/19* (2020.01)
*H04L 43/10* (2022.01)

(52) U.S. Cl.
CPC ............ *H05B 47/19* (2020.01); *H04L 43/10* (2013.01)

(58) Field of Classification Search
CPC ............................... H05B 47/19; H04L 43/10
See application file for complete search history.

(56) References Cited

U.S. PATENT DOCUMENTS 9,246,805 B2 * 1/2016 Yoneyama ............... H04L 45/12
9,596,156 B2 * 3/2017 Balwani .............. H04L 43/0811
9,820,361 B1   11/2017 Turvy, Jr. et al.
(Continued)

FOREIGN PATENT DOCUMENTS

CN        104516798 A  *  4/2015
JP        2011082775 A     4/2011
(Continued)

*Primary Examiner* — Oanh Duong

(57) ABSTRACT

The invention relates to an electronic device (1) for determining a reachability of a further electronic device (15-18) over a wireless connection. The further electronic device is part of a wireless network. The electronic device is configured to determine whether the further electronic device is reachable using a first wireless communication protocol (31), determine whether the further electronic device is reachable using a second wireless 5 communication protocol (33), and provide an indication of a status of the further electronic device based on the reachability of the further electronic device using the first wireless communication protocol and the reachability of the further electronic device using the second wireless communication protocol.

13 Claims, 11 Drawing Sheets

Legend:

101 - Transmitting a test message to the electronic device using the first wireless communication protocol 103 - Determining whether the further electronic device is reachable using a first wireless communication protocol 105 - Determining whether the electronic device is reachable using a second wireless communication protocol 107 - Providing an indication of a status of the further electronic device based on the reachability of the further electronic device using the first wireless communication protocol and the reachability of the further electronic device using the second wireless communication protocol 109 - Transmitting a configuration message to the further electronic device over the second wireless communication protocol upon determining that the further electronic device is unreachable over the first wireless communication protocol

(56) References Cited

U.S. PATENT DOCUMENTS

| | | | |
|---|---|---|---|
| 11,020,860 B2* | 6/2021 | Cheuvront | G06F 16/00 |
| 2010/0315261 A1 | 2/2010 | Tuckett | |
| 2013/0308471 A1* | 11/2013 | Krzanowski | H04L 43/0811 |
| | | | 370/252 |
| 2014/0243039 A1 | 8/2014 | Schmidt et al. | |
| 2015/0087232 A1 | 3/2015 | Sloan | |
| 2016/0029457 A1* | 1/2016 | Sung | H05B 47/19 |
| | | | 315/294 |
| 2017/0361468 A1* | 12/2017 | Cheuvront | A47L 9/2857 |
| 2018/0027477 A1* | 1/2018 | Apostolakis | H04W 40/28 |
| | | | 370/254 |
| 2018/0227204 A1* | 8/2018 | Magielse, Sr. | H04L 43/0817 |
| 2019/0021133 A1* | 1/2019 | Vandenheste | H04L 63/0428 |

FOREIGN PATENT DOCUMENTS

| | | | |
|---|---|---|---|
| JP | 2014186417 A | 3/2013 |
| JP | 2016119658 A | 6/2016 |
| JP | 2016197831 A | 11/2016 |
| KR | 20160044240 A | 4/2016 |

\* cited by examiner

Legend:
1 - mobile device
9 - display
42 - screen
49 - Living Room group
51 - icon
52 - text field
53 - icon
54 - icon
61 - icon
62 - text field
63 - icon
64 - icon Legend:

151 - Receiving a broadcast from a further electronic device in a wireless network via second wireless communication protocol 153 - Determining a value which represents a measure of proximity between the electronic device and the further electronic device based on the broadcast 155 - Determined value, e.g. RSSI, is compared with a threshold 157 - Providing an indication of a status of the further electronic device based on the reachability of the further electronic device using the first wireless communication protocol and the reachability of the further electronic device using the second wireless communication protocol

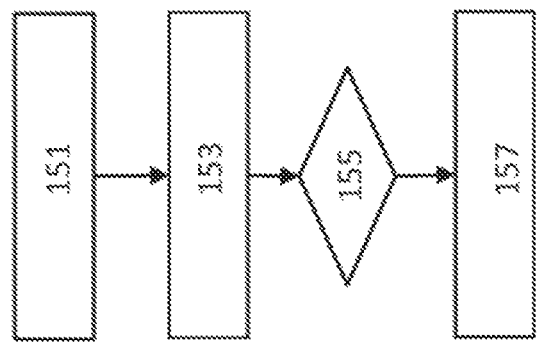

Fig. 10

DETERMINING A REACHABILITY OF AN ELECTRONIC DEVICE OVER MULTIPLE WIRELESS COMMUNICATION PROTOCOLS

CROSS-REFERENCE TO PRIOR APPLICATIONS

This application is the U.S. National Phase application under 35 U.S.C. § 371 of International Application No. PCT/EP2020/053259, filed on Feb. 10, 2020, which claims the benefit of European Patent Application No. 19157113.2, filed on Feb. 14, 2019. These applications are hereby incorporated by reference herein.

FIELD OF THE INVENTION

The invention relates to an electronic device for determining a reachability of a further electronic device over a wireless connection, said further electronic device being part of a wireless network.

The invention further relates to a method of determining a reachability of a further electronic device over a wireless connection, said further electronic device being part of a wireless network.

The invention also relates to a computer program product enabling a computer system to perform such a method.

BACKGROUND OF THE INVENTION

In connected lighting, a user expects to be able to use his mobile device to control his connected lighting devices. If something does not work as expected, it is often difficult to determine the root cause (e.g. lamp out of reach, lamp not powered, bridge not powered, app not setup correctly).

In connected lighting, the control and/or behavior of lamps is sometimes disturbed by a hard switch-off of the lamps or lamps can be (just) out of wireless reach. A lamp can be within reach at one moment and out of reach at the next moment due to other lamps have been switched off or due to environmental changes (e.g. a user closing a metal door in an adjacent room). It can therefore be quite tedious to find the root cause of a malfunctioning system.

There are systems that are capable of showing the state of a network device on a mobile device. For example, US2018/0227204A1 discloses a method that involves determining a first count value associated with a first network device and a second count value associated with a second network device, which is adapted to pass messages to the first network device, and determining a state of the first network device based on the first count value and the second count value. A count value may be a measure of the number of messages transmitted to/received by the first network device, for example. When the first count value is within a predetermined range relative to the second count value, e.g. significantly lower than the second count value, the first network device is determined to be inactive. In an embodiment, information based on the state of the first network device is displayed on a visual output display.

The method of US2018/0227204A1 helps determine whether a problem has occurred, but it does not help to determine why a device is currently not controllable. Just flipping the switch and looking if the light turns on or remains off may help find the cause of this problem, but this is not always possible. However, it might happen that the lamp/luminaire turns from not powered to standby without giving any feedback whatsoever to the user. For example, the Zigbee Lighting & Occupancy Device Specification version 1.0 specifies a StartUpOnOff attribute that defines the desired startup behavior of a light device when it is supplied with power. When the StartUpOnOff attribute is set to the value 0x00, the light source(s) of the light device are not turned on when the light device is supplied with power. Flipping the switch could also unintentionally turn on other lamps connected to the same switch, potentially disturbing other users.

KR 2016/0044240 A discloses a wireless lighting apparatus capable of forming a network between lighting apparatuses by having a wireless communication means and transmitting lighting control information through the network, and a control method thereof.

SUMMARY OF THE INVENTION

It is a first object of the invention to provide an electronic device, which can be used to find the cause for a further electronic device not being remotely controllable.

It is a second object of the invention to provide a method, which can be used to find the cause for an electronic device not being remotely controllable.

In a first aspect of the invention, an electronic device for determining a reachability of a further electronic device over a wireless connection, said further electronic device being part of a wireless network, comprises at least one input interface, at least one output interface, and at least one processor configured to use said at least one input interface to determine whether said further electronic device is reachable using a first wireless communication protocol, use said at least one input interface to determine whether said further electronic device is reachable using a second wireless communication protocol, and use said at least one output interface to provide an indication of a status of said further electronic device based on said reachability of said further electronic device using said first wireless communication protocol and said reachability of said further electronic device using said second wireless communication protocol.

By determining a reachability of the further electronic device using multiple different wireless communication protocols and providing an indication of a status of the further electronic device based on this information, the user is able to exclude certain causes for the further electronic device not being controllable remotely (i.e. not controllable using a device other than the further electronic device). If the further electronic device is normally controlled using the first wireless communication protocol and not reachable using this protocol, but the further electronic device is reachable using the second wireless communication protocol, then it is evident that the further electronic device is turned on and that the cause of the problem is more complicated.

Said electronic device may be part of a system, e.g. lighting system, which further comprises said further electronic device, e.g. a lighting device. Said first wireless communication protocol may be Zigbee, for example. Said second wireless communication protocol may be Bluetooth, for example. Said at least one processor may be configured to use said at least one output interface to provide said indication via a display, via an audio output and/or via haptic feedback, for example. The determination whether the electronic device is reachable using the first wireless communication protocol may be performed using the second wireless protocol.

For example, a connected lamp may have Bluetooth and ZigBee connectivity (either in separate radios or concurrently by time sharing a single RF front end) and an app may be running on a smartphone which can show to the user information about both the Bluetooth and ZigBee communication paths of the lamp. A central device like a bridge may help in providing/translating information to the app.

Said at least one processor may be configured to use said at least one output interface to transmit a test message to said further electronic device using said first wireless communication protocol and use said at least one input interface to determine that said further electronic device is reachable using said first wireless communication protocol upon receipt of a transmission in response to said test message. By sending a test message, it is possible to find out whether there is a problem and signal this problem before a user wants to control the further electronic device.

Said at least one processor may be configured to use said at least one output interface to transmit said test message to said further electronic device using said first wireless communication protocol via a network device in said wireless network. The network device may be a bridge, for example. Although it may be possible to remote control connected devices via a direct connection, many connected devices can be controlled via a bridge (e.g. a Philips Hue bridge) or via an access point, e.g. to extend the range over which the connected device can be controlled.

Said at least one processor may be configured to use said at least one input interface to determine that said further electronic device is reachable using said second wireless communication protocol upon receipt of a broadcast which uses said second wireless communication protocol from said further electronic device. Connected devices may broadcast their presence and optionally a list of offered services/capabilities, e.g. using Bluetooth. This broadcast typically means that the device broadcasting the broadcast over a certain wireless communication protocol is reachable using this certain wireless communication protocol.

Said at least one processor may be configured to use said at least one input interface to receive information from said further electronic device using said second wireless communication protocol, said information indicating how said further electronic device can be reached using said first wireless communication protocol. The information may comprise a certain protocol configuration setting, a device address and/or a security key, for example.

Said at least one processor may be configured to use said at least one input interface to receive information from said further electronic device using said second wireless communication protocol, said information indicating whether said further electronic device is reachable using said first wireless communication protocol. This avoids the need for a separate test message using the first wireless communication protocol, while still allowing the user to determine whether there is a problem beforehand. The electronic device to be controlled often knows if it is not controllable via a certain wireless communication protocol.

Said at least one processor may be configured to determine a value which represents a measure of proximity, e.g. distance, between said electronic device and said further electronic device and provide said indication in dependence on said measure of proximity being smaller than a certain threshold. This is especially beneficial if many controllable devices have been installed and allows a user to stand next to the electronic device that seems to have a problem to learn its status.

Said at least one processor may be configured to provide said indication by providing a notification upon determining that said measure of proximity is smaller than said certain threshold. This reduces the amount of interaction required by the user. The indication may always be provided if the user is near the further electronic device or only if the user is near the further electronic device and the further electronic is not reachable using the first wireless communication protocol or not reachable using the second wireless communication protocol, for example. The measure of proximity may be determined by using one of the two wireless communication protocols. In this case, it may only be possible to provide the notification upon determining the measure of proximity if the further electronic device is at least reachable using this wireless communication protocol.

Said at least one processor may be configured to use said at least one output interface to provide an indication of one or more other electronic devices having a similar or same status as said further electronic device. This information may help the user determine the cause of the problem or solve the problem better.

Said at least one processor may be configured to use said at least one output interface to transmit a configuration message to said further electronic device over said second wireless communication protocol upon determining that said further electronic device is unreachable over said first wireless communication protocol. The configuration message may comprise a certain protocol configuration setting, a device address and/or a security key, for example. If a problem is detected in relation to the first wireless communication protocol, there may a first attempt to solve the problem automatically using the second wireless communication protocol, before or after the indication of the status of the further electronic device has been provided.

In a second aspect of the invention, a method of determining a reachability of an electronic device over a wireless connection, said electronic device being part of a wireless network, comprises determining whether said electronic device is reachable using a first wireless communication protocol, determining whether said electronic device is reachable using a second wireless communication protocol, and providing an indication of a status of said electronic device based on said reachability of said electronic device using said first wireless communication protocol and said reachability of said electronic device using said second wireless communication protocol. Said method may be performed by software running on a programmable device. This software may be provided as a computer program product.

The determination whether the electronic device is reachable using the first wireless communication protocol may be performed using the second wireless protocol.

In a third aspect of the invention, a computer-implemented method of indicating via a portable electronic device a reachability of a lighting device, said lighting device being part of a wireless network, comprises determining whether said lighting device is reachable from said portable electronic device using a point-to-point wireless communication protocol and if a determination is made that said lighting device is reachable using said point-to-point wireless communication protocol: indicating via said portable electronic device to a user that said lighting device is reachable, receiving via said portable electronic device an input for controlling said lighting device, and controlling said lighting device over said wireless network using a wireless communication protocol different from said point-to-point wireless communication protocol.

Thus, the lighting device is assumed to be reachable over the second (different) wireless communication protocol if the lighting device has been confirmed to be reachable over the point-to-point wireless communication protocol.

The portable electronic device may be a smart phone, for example. The point-to-point wireless communication protocol may be Bluetooth, for example. The second (different) wireless communication protocol may be Zigbee, for example. The portable electronic device may be considered to be reachable from the lighting device when the portable electronic device receives a broadcast from the lighting device using the point-to-point wireless communication protocol or when the portable electronic device transmits a message to the lighting device and receives a reply to this message, e.g. an acknowledgement, using the point-to-point wireless communication protocol. In a fourth aspect of the invention, a computer-implemented method of indicating via a lighting device a reachability of said lighting device, said lighting device being part of a wireless network, comprises receiving a transmission from a portable electronic device at said lighting device using a point-to-point wireless communication protocol and upon receiving said transmission: indicating via said lighting device to a user that said lighting device is reachable using both said point-to-point wireless communication and a wireless communication protocol different from said point-to-point wireless communication protocol.

A lamp being reachable via Bluetooth may already indicate that the lamp is also reachable via Zigbee. So if via Bluetooth a message is send to a lamp, it could start blinking/give confirmation flashes to show it has not been turned off (e.g. with a switch) and the light itself is not broken.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising determining whether an electronic device is reachable using a first wireless communication protocol, determining whether said electronic device is reachable using a second wireless communication protocol, and providing an indication of a status of said electronic device based on said reachability of said electronic device using said first wireless communication protocol and said reachability of said electronic device using said second wireless communication protocol.

A non-transitory computer-readable storage medium stores at least a second software code portion, the second software code portion, when executed or processed by a computer, being configured to perform executable operations comprising: determining whether a lighting device is reachable from a portable electronic device using a point-to-point wireless communication protocol and if a determination is made that said lighting device is reachable using said point-to-point wireless communication protocol: indicating via said portable electronic device to a user that said lighting device is reachable, receiving via said portable electronic device an input for controlling said lighting device, and controlling said lighting device over said wireless network using a wireless communication protocol different from said point-to-point wireless communication protocol.

A non-transitory computer-readable storage medium stores at least a third software code portion, the third software code portion, when executed or processed by a computer, being configured to perform executable operations comprising: receiving a transmission from a portable electronic device at a lighting device using a point-to-point wireless communication protocol and upon receiving said transmission: indicating via said lighting device to a user that said lighting device is reachable using both said point-to-point wireless communication and a wireless communication protocol different from said point-to-point wireless communication protocol.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which:

FIG. 10 is a flow diagram of a third embodiment of the method; and

Corresponding elements in the drawings are denoted by the same reference numeral.

DETAILED DESCRIPTION OF THE EMBODIMENTS

Figure 1:
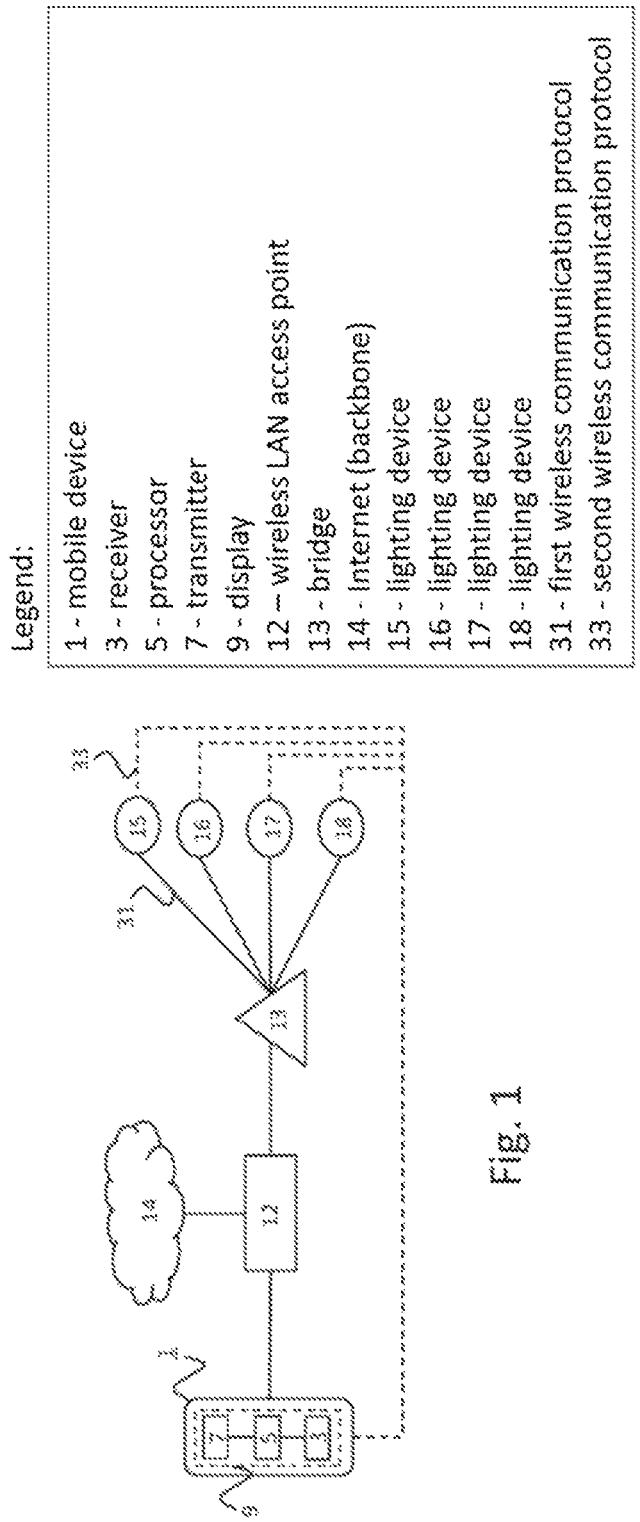
FIG. 1 is a block diagram of a first embodiment of the electronic device.

FIG. 1 shows a first embodiment of the electronic device for determining a reachability of a further electronic device over a wireless connection system. In the embodiment of FIG. 1, the mobile device 1 is configured to determine a reachability of one or more of lighting devices 15 to 18. The mobile device 1 is connected to a wireless LAN access point 12. A bridge 13, e.g. a Philips Hue bridge, is also connected to the wireless LAN access point 12, e.g. via Ethernet.

In the embodiment of FIG. 1, the bridge 13 communicates with the lighting devices 15-18 using Zigbee technology. The bridge 13 and the lighting devices 15 to 18 are part of a Zigbee network. The lighting devices 15-18 may be Philips Hue lights, for example. The wireless LAN access point 12 is connected to Internet (backbone) 14.

The mobile device 1 comprises a receiver 3, a processor 5, a transmitter 7 and a display 9. The processor 5 is configured to use the receiver 3 to determine whether one or more of the lighting devices 15-18 are reachable using a first wireless communication protocol, use the receiver 3 to determine whether the one or more lighting devices are reachable using a second wireless communication protocol, and use the display 9 to provide an indication of a status of the one or more lighting devices based on the reachability of the one or more lighting devices using the first wireless communication protocol and the reachability of the one or more lighting devices using the second wireless communication protocol.

If a malfunction occurs, or the user just wants to have the status confirmed, the user may be able to keep the mobile device 1 close to the lighting devices whose status he is interested in. The app running on the mobile device 1 may now show if the lighting device can be contacted by e.g. showing a connectivity indicator belonging to ZigBee (i.e. the lighting device is reachable via the bridge 13) and another one belonging to Bluetooth (i.e. the lighting device is within proximity of the mobile device 1).

If the ZigBee connectivity indicator shows no connectivity, but the Bluetooth connectivity indicator shows connectivity, then it means that the lighting device is powered (since it provides Bluetooth signals), but that it may be out of reach of the bridge 13. The user could in this case set the lighting device to a default state via the wall switch, or potentially even via the Bluetooth interface, if enabled.

If a lighting device is powered, but is not reachable, it is beneficial to allow the user to check other lighting devices in the Zigbee network. Knowing how many other lighting devices in the same room/vicinity are sharing the same characteristics (e.g. ZigBee off, but Bluetooth on) would give an indication of the severity of the reachability problem towards the bridge.

If both the ZigBee and Bluetooth connectivity indicators show no connectivity, then this is an indication that likely, the lighting device is simply not powered, and as such the user can either have it replaced if it is broken, or manually switch it on via the wall switch to return it to an operational state.

The mechanism can be made a bit less invasive or manual by e.g. providing haptic feedback to the user when in close proximity to the lamp. This way, the user might not need to take out his phone, unlock it, open the app, and search for the light, but instead just know that since when he approached the light his phone vibrated it means that this specific light is not reachable via ZigBee but is via Bluetooth, for example. In addition to or instead of haptic feedback, a light of the mobile device 1 might be used to provide feedback. For example, different blink patterns may be linked to each connectivity mode or the light may blink red if reachable on ZigBee and blue if reachable on Bluetooth.

Additionally, if the above happens, the app may be able to generate a notification on the display 9 of the mobile device 1 informing the user that, although the lighting device might be unreachable via ZigBee, it can still be controlled via Bluetooth, so the user can decide to easily change its settings.

In the embodiment of FIG. 1, the first wireless communication protocol is Zigbee and the second wireless communication protocol is Bluetooth. In an alternative embodiment, one or more different protocols may be used. In the embodiment of FIG. 1, the processor 5 is configured to provide the indication via the display 9. In an alternative embodiment, the processor 5 is configured to additionally or alternative provide the indication via an audio output and/or via haptic feedback.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. In the embodiment shown in FIG. 1, the mobile device 1 comprises a separate receiver 3 and transmitter 7. In an alternative embodiment, the receiver 3 and transmitter 7 have been combined into a transceiver. In this alternative embodiment or in a different alternative embodiment, multiple receivers and/or multiple transmitters are used.

The receiver 3 and transmitter 7 may use one or more wireless communication technologies to communicate with the wireless access point 12, e.g. Wi-Fi. The display 9 may comprise an LCD or OLED display panel, for example. The display 9 may be a touch screen, for example. The processor 5 may use this touch screen to provide a user interface, for example. The mobile device 1 may comprise other components typical for a mobile device such as a battery, a memory and a power connector. The memory may comprise one or more memory units. The memory may comprise solid state memory, for example. The invention may be implemented using a computer program running on one or more processors.

In the embodiment of FIG. 1, a bridge is used to control lighting devices 15-18. In an alternative embodiment, lighting devices 15-18 are controlled without using a bridge.

Figure 2:
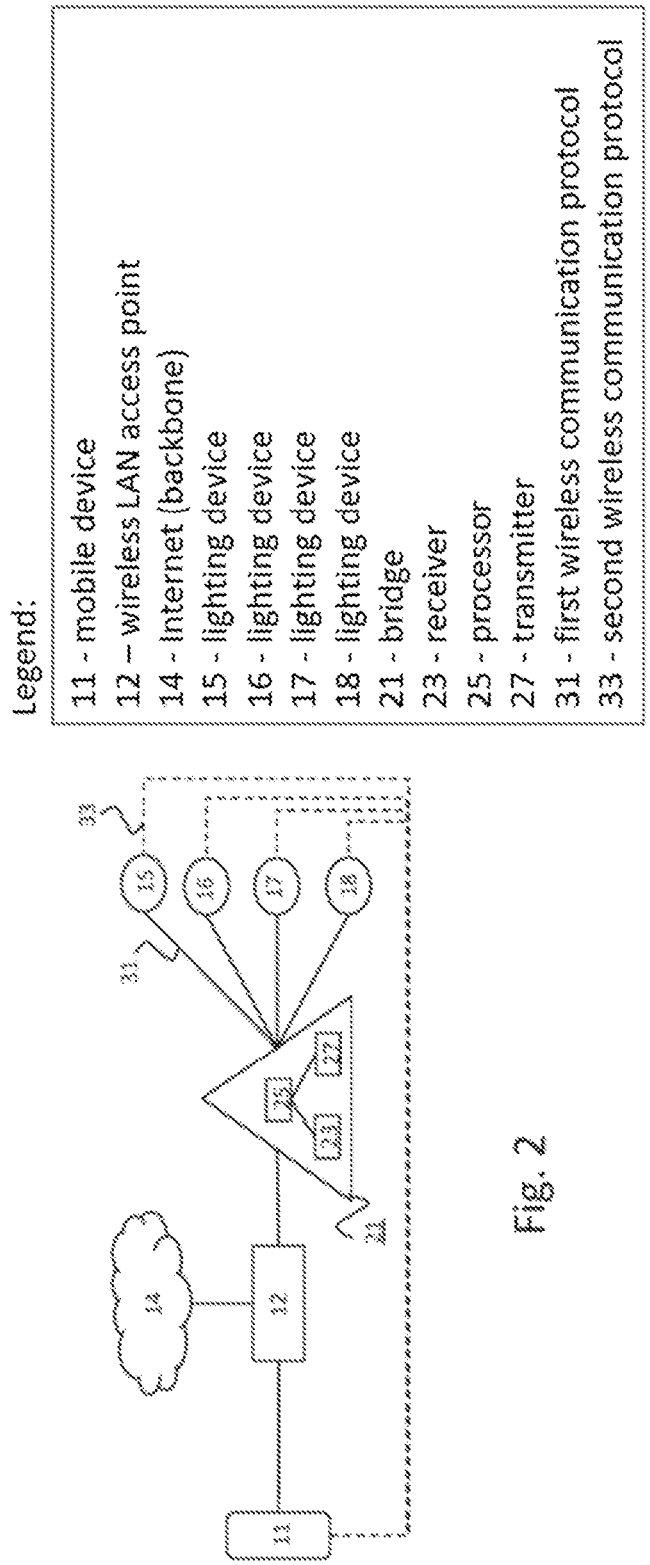
FIG. 2 is a block diagram of a second embodiment of the electronic device.

FIG. 2 shows a second embodiment of the electronic device for determining a reachability of a further electronic device over a wireless connection system: a bridge 21, e.g. a Philips Hue bridge. The bridge 21 comprises a receiver 23, a processor 25, and a transmitter 27. The processor 25 is configured to use the receiver 23 to determine whether one or more of the lighting devices 15-18 are reachable using a first wireless communication protocol, use the receiver 23 to determine whether the one or more lighting devices are reachable using a second wireless communication protocol, and use the transmitter 27 to provide an indication of a status of the one or more lighting devices based on the reachability of the one or more lighting devices using the first wireless communication protocol and the reachability of the one or more lighting devices using the second wireless communication protocol. The indication may be transmitted to and displayed on a mobile device 11, for example.

In the embodiment of the bridge 21 shown in FIG. 2, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The receiver 23 and transmitter 27 may use one or more wired and/or wireless communication technologies to communicate with the wireless LAN access point 12, e.g. Ethernet. In the embodiment shown in FIG. 2, the bridge 21 comprises a separate receiver 23 and transmitter 27. In an alternative embodiment, the receiver 23 and transmitter 27 have been combined into a transceiver. In this alternative embodiment or in a different alternative embodiment, multiple receivers and/or multiple transmitters are used.

The bridge 21 may comprise other components typical for a network device such as a memory and a power connector. The memory may comprise one or more memory units. The memory may comprise one or more hard disks and/or solid-state memory, for example. The memory may be used to store a table of connected lights, for example. The invention may be implemented using a computer program running on one or more processors.

Figure 3:
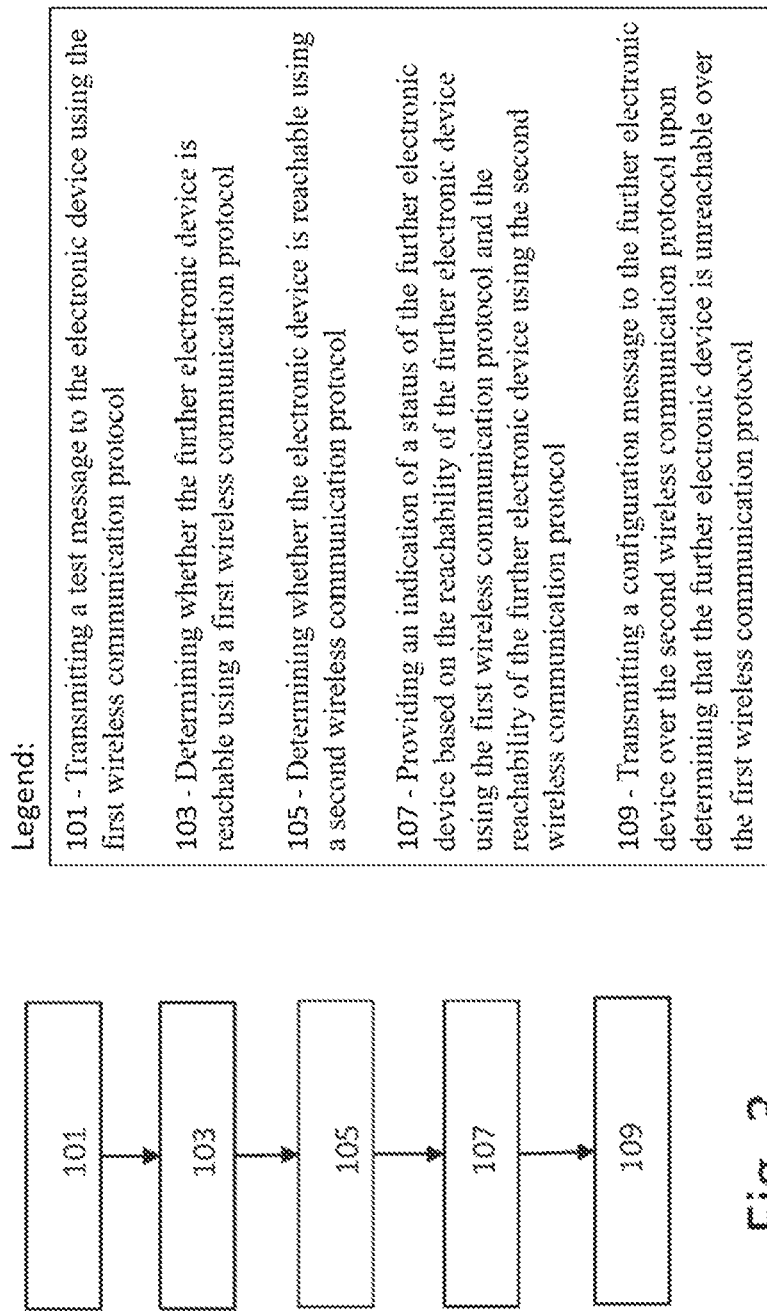
FIG. 3 is a flow diagram of a first embodiment of the method.

A first embodiment of the method of determining a reachability of an electronic device over a wireless connection method is shown in FIG. 3. In this first embodiment, a step 101 comprises transmitting a test message to the electronic device using the first wireless communication protocol, e.g. via a network device in the wireless network. A step 103 comprises determining whether the further electronic device is reachable using a first wireless communication protocol. The electronic device is determined to be reachable using the first wireless communication protocol upon receipt of a transmission in response to the test message.

A step 105 comprises determining whether the electronic device is reachable using a second wireless communication protocol. In the embodiment of FIG. 3, step 105 comprises determining that the electronic device is reachable using the second wireless communication protocol upon receipt of a broadcast which uses the second wireless communication protocol from the further electronic device.

A step 107 comprises providing an indication of a status of the further electronic device based on the reachability of the further electronic device using the first wireless communication protocol and the reachability of the further electronic device using the second wireless communication protocol.

In the embodiment of FIG. 3, a step 109 is performed next. Step 109 comprises transmitting a configuration message to the further electronic device over the second wireless communication protocol upon determining that the further electronic device is unreachable over the first wireless communication protocol.

Figure 4:
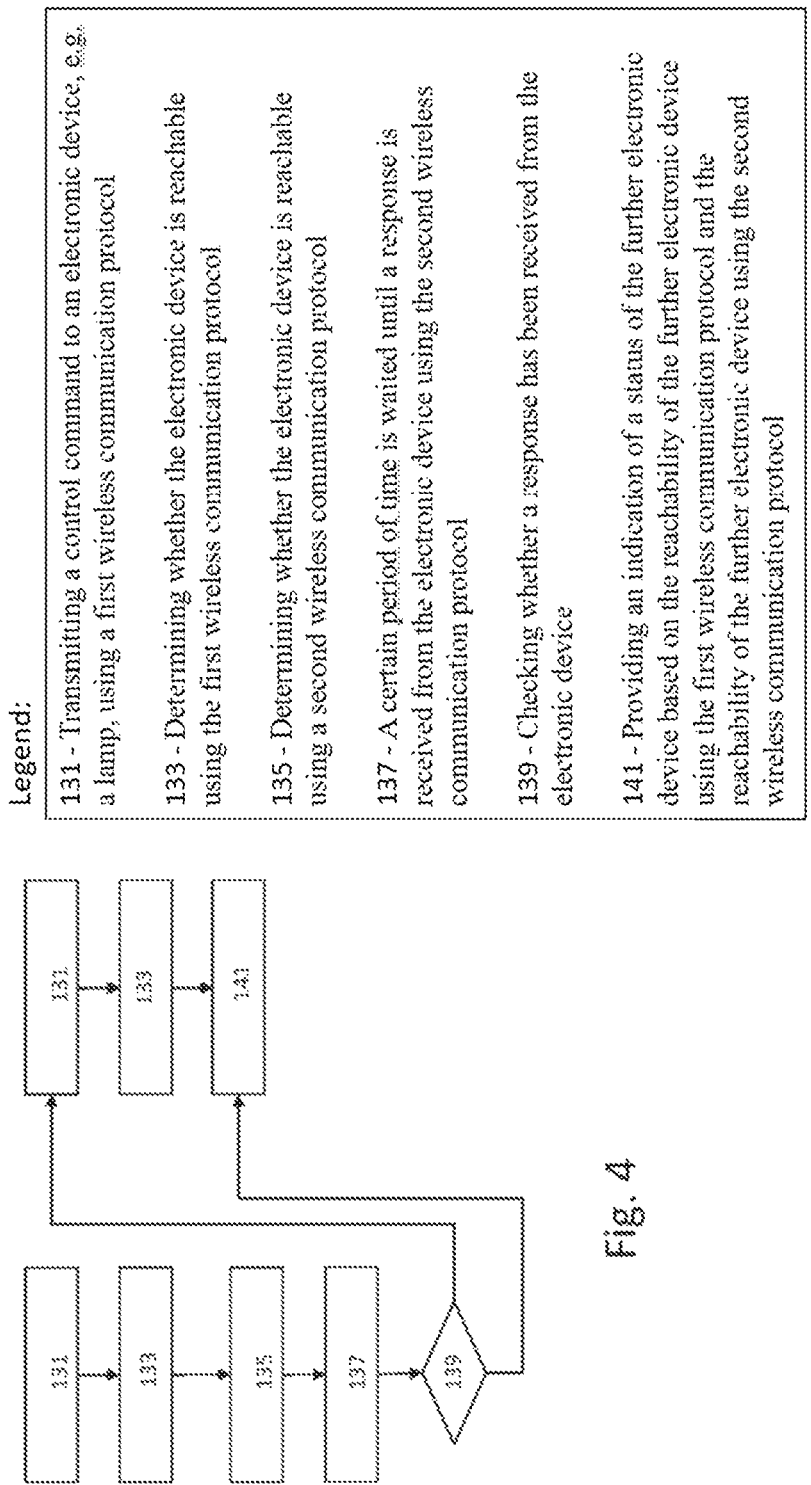
FIG. 4 is a flow diagram of a second embodiment of the method.

A second embodiment of the method is shown in FIG. 4. A step 131 comprises transmitting a control command to an electronic device, e.g. a lamp, using a first wireless communication protocol. A step 133 comprises determining whether the electronic device is reachable using the first wireless communication protocol. If no acknowledgement is received to the control command, the electronic device is determined not to be reachable using the first wireless communication protocol.

A step 135 comprises determining whether the electronic device is reachable using a second wireless communication protocol. In the embodiment of FIG. 4, step 135 comprises transmitting a test message to the electronic device via the second wireless communication protocol. If it is not known which address can be used to reach the electronic device via the second wireless communication protocol, the test message may be a broadcast message that comprises the address that can be used to reach the electronic device via the first wireless communication protocol, which may then be recognized by the electronic device.

In step 137, a certain period of time is waited until a response is received from the electronic device using the second wireless communication protocol. In step 139, it is checked whether a response has been received from the electronic device.

If a response has been received from the electronic device and the response comprises information indicating how the electronic device can be reached using the first wireless communication protocol, steps 131 and 133 are performed again, but now using the information received in step 137. If an acknowledgement to the control command transmitted in step 133 is received, the electronic device is determined to be reachable using the first wireless communication protocol. If the control command is not acknowledged, the electronic device is determined still not to be reachable using the first wireless communication protocol.

If the response does not comprise the above-mentioned information, step 141 is performed next. In both cases, the electronic device is determined to be reachable via the second wireless communication protocol.

If it is determined in step 139 that no response has been received from the electronic device, the electronic device is determined to be unreachable using the second wireless communication protocol and step 141 is performed next. Step 141 comprises providing an indication of a status of the further electronic device based on the reachability of the further electronic device using the first wireless communication protocol and the reachability of the further electronic device using the second wireless communication protocol.

Figure 5:
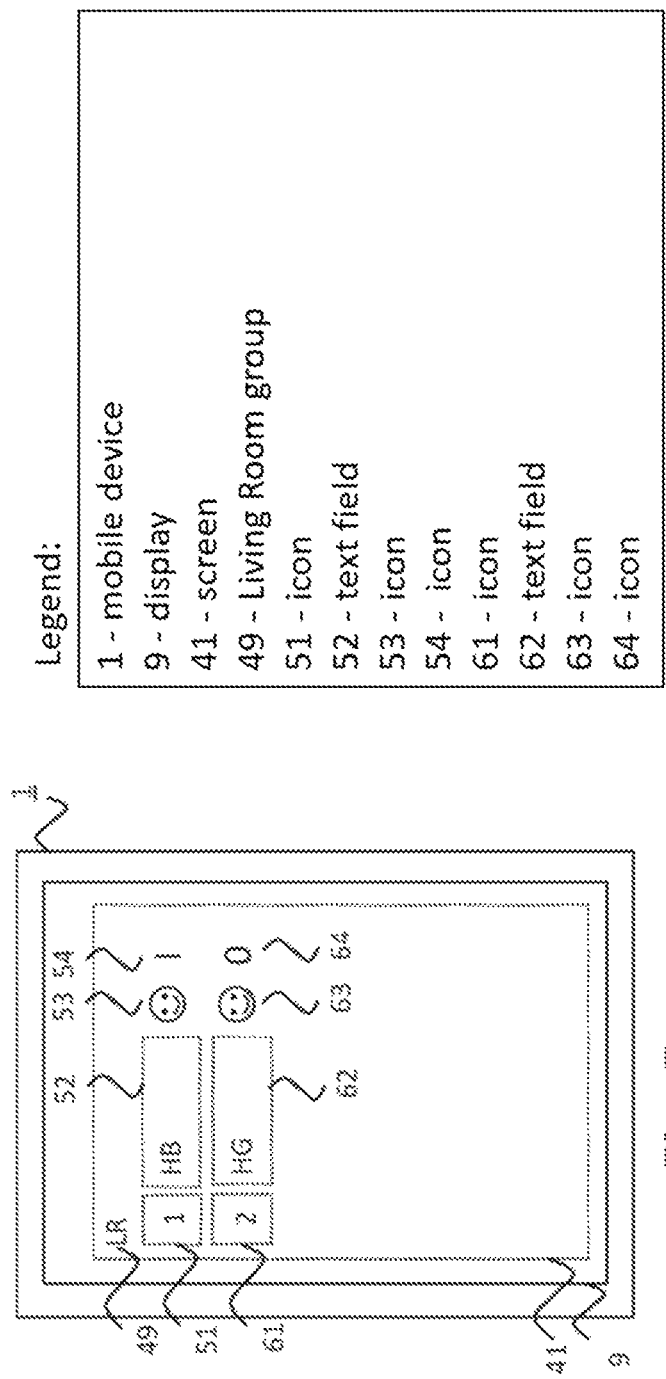
FIGS. 5 and 6 show an example of a user interface for indicating a status of a further electronic device which has not been determined using the invention.
Figure 6:
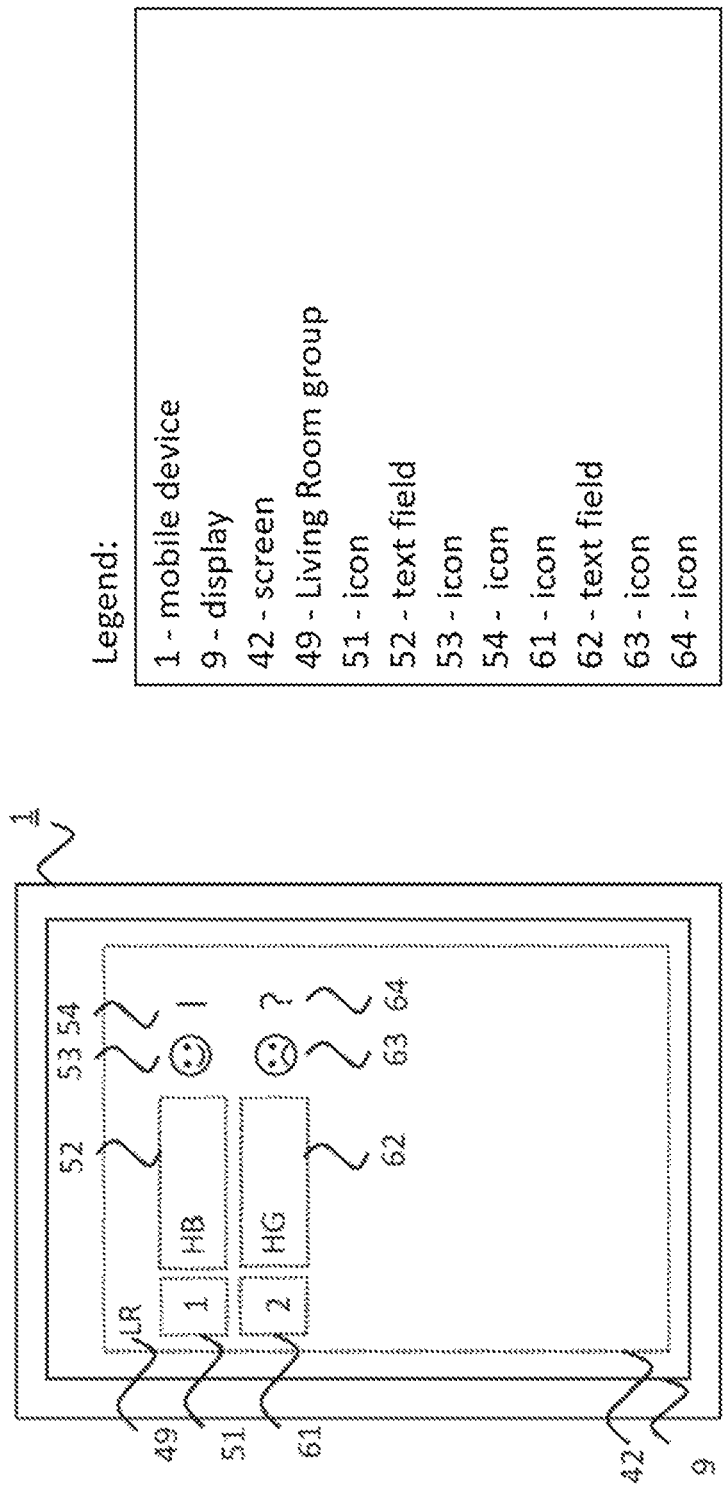

FIGS. 5 and 6 show an example of a user interface for indicating a status of a further electronic device which has not been determined using the invention. In the example of FIG. 5, a first screen 41 of the user interface is shown on the display 9 of the mobile device 1 of FIG. 1. With the user interface, a user is able to control his connected lighting devices. Lighting devices 15 and 16 of FIG. 1 are represented by icons 51 and 61 and by names in text fields 52 and 62, respectively.

In the example of FIG. 5, the icons 51 and 61 comprise numbers, but it is also possible to represent lighting devices differently in the icons. Lighting device 15 is named "Hue Bloom" and represented by icon 51 and lighting device 16 is named "Hue Go" and represented by icon 52. Lighting devices 15 and 16 (represented by icons 51 and 61) have been assigned to the Living Room group 49.

In the user interface depicted in FIG. 5, icons 53 and 63 indicate whether the lighting devices 15 and 16 (represented by icons 51 and 61) are reachable or not. In screen 41, icons 53 and 63 indicate the lighting devices 15 and 16 are reachable. Icons 54 and 64 indicate the state of the lighting devices 15 and 16, respectively. In screen 41, icon 54 indicates that the light source of the lighting device 15 is currently on and icon 64 indicates that the light source of the lighting device 16 is currently off. By pressing icon 54 and/or icon 64, the light source of the corresponding lighting device can be switched on/off.

A second screen 42 of this user interface is shown in FIG. 6. In this second screen 42, the icon 63 indicates that the lighting device 16 (represented by icon 61) is not reachable. Icon 64 indicates that it is not known whether the light source of the lighting device 16 is currently on or off. The light source of the lighting device 16 cannot be controlled by pressing icon 64 in screen 42.

Figure 7:
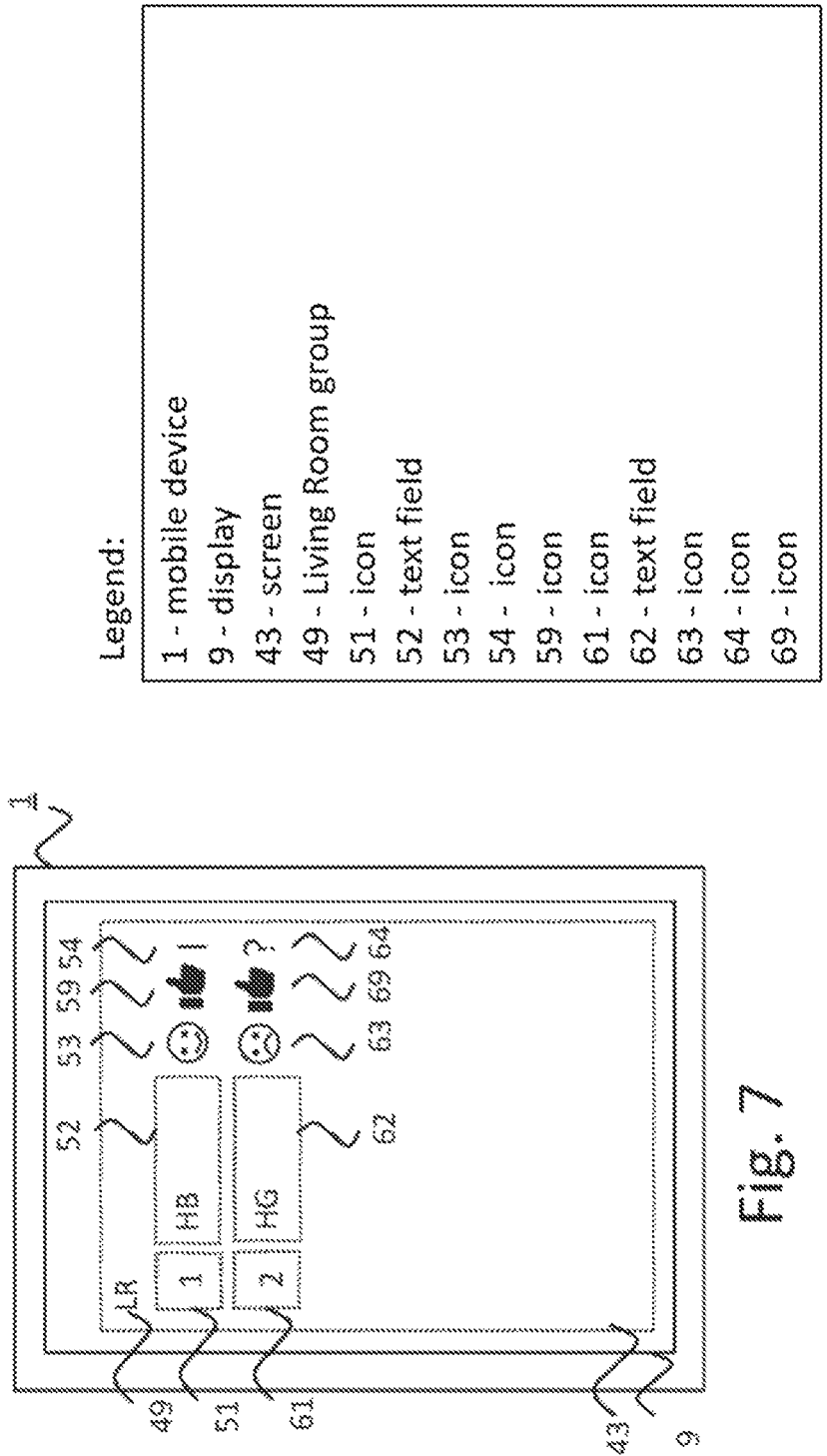
FIG. 7 shows a first example of a user interface for indicating a status of a further electronic device which has been determined using the invention.

FIG. 7 shows a screen 43 of a first embodiment of a user interface for indicating a status of a further electronic device which has been determined using the invention. The status of lighting device 15 (represented by icon 51) comprises two icons: icon 53 and icon 59. Icon 53 indicates the reachability of the lighting device 15 using the first wireless communication protocol. Icon 59 indicates the reachability of the lighting device 15 using the second wireless communication protocol.

The status of lighting device 16 (represented by icon 61) comprises two icons: icon 63 and icon 69. Icon 63 indicates the reachability of the lighting device 16 using the first wireless communication protocol. Icon 69 indicates the reachability of the lighting device 16 using the second wireless communication protocol. Like in screen 42 of FIG. 6, the lighting device 16 is not reachable using the first wireless communication protocol, as indicated by icon 63. However, both lighting devices 15 and 16 are reachable using the second wireless communication protocol, as indicated by icons 59 and 69. It this therefore clear to the user that the lighting device 16 is on and that the problem is less straightforward.

Figure 8:
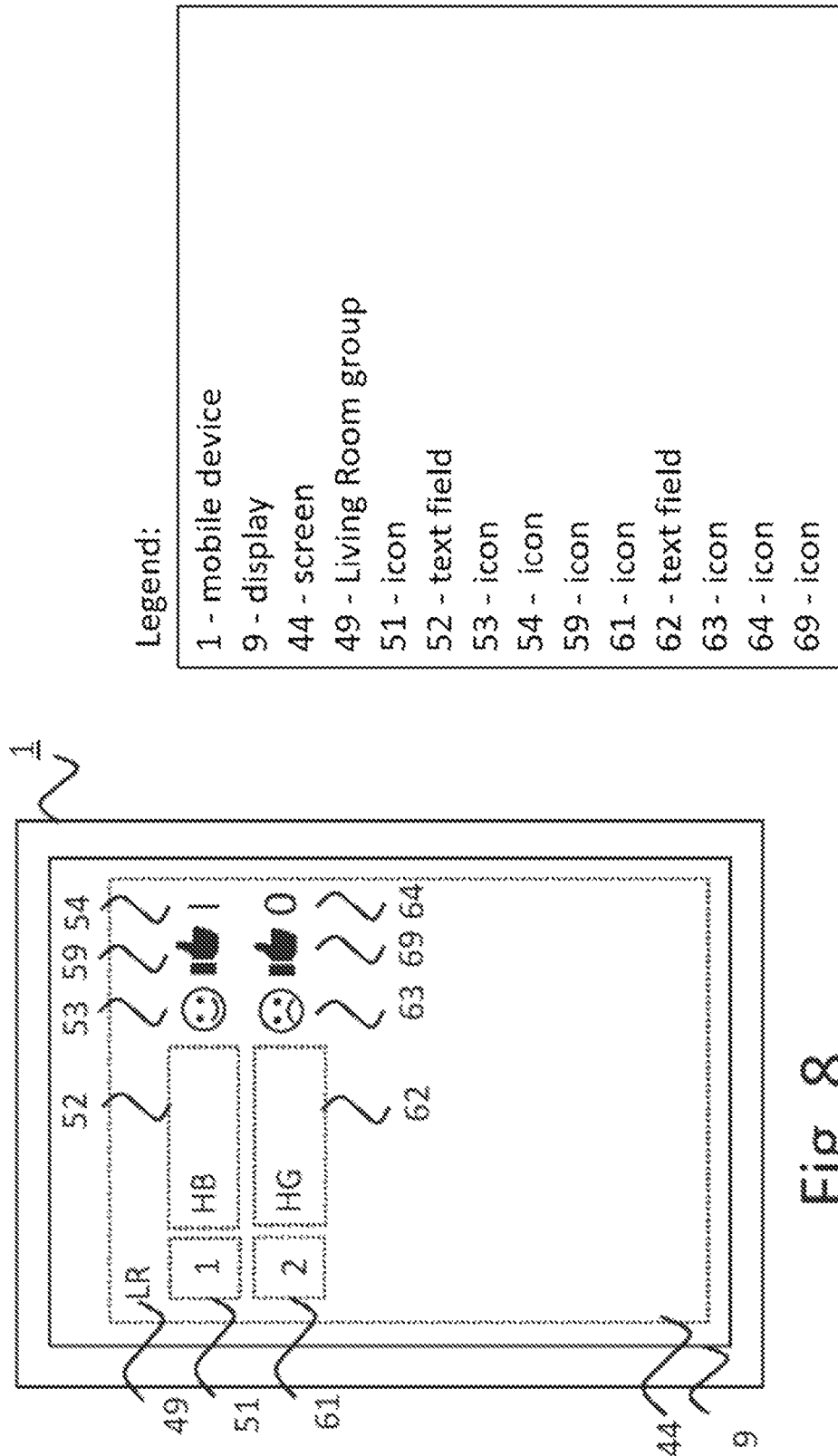
FIG. 8 shows a second example of a user interface for indicating a status of a further electronic device which has been determined using the invention.

In the first embodiment of the user interface of FIG. 7, icon 64 indicates that it is not known whether the light source of the lighting device 16 is on or off, because this information could not be obtained via the first wireless communication protocol. In the second embodiment of the user interface of FIG. 8, icon 64 shown in screen 44 indicates that the light source of the lighting device 16 is off, because this information was included by the lighting device 16 in the message transmitted using the second wireless communication protocol.

Figure 9:
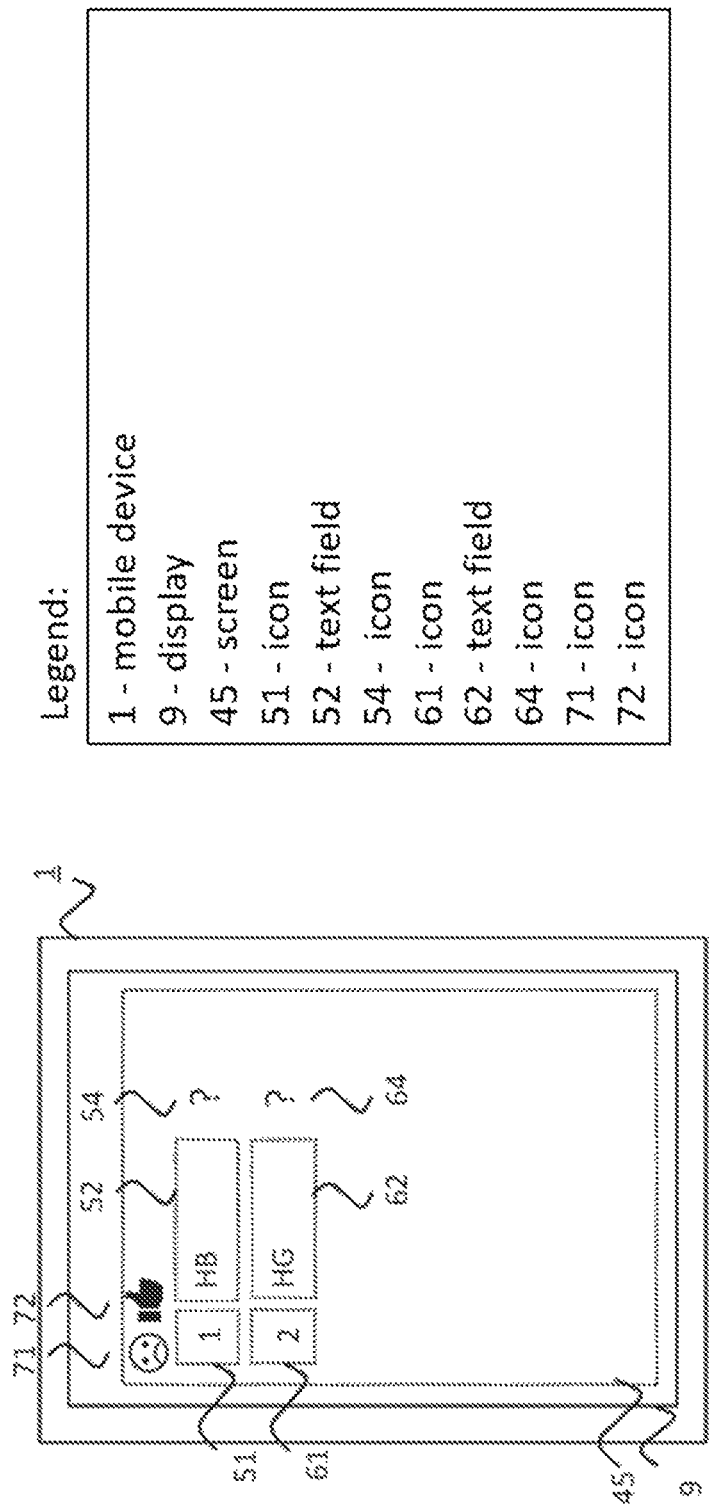
FIG. 9 shows a third example of a user interface for indicating a status of a further electronic device determined which has been determined using the invention.

In the third embodiment of the user interface of FIG. 9, a screen 45 identifies devices having a similar or same status. In this example, screen 45 shows lighting devices which are not reachable via the first protocol (represented by icon 71), but which are reachable via the second protocol (represented by icon 72). Screen 45 may be shown after selecting a certain status, e.g. "not reachable via the first protocol and reachable via the second protocol", and/or a certain lighting device, e.g. lighting device 15 or lighting device 16. In this third embodiment of the user interface, icons 54 and 64 indicate that it is not known whether the light source of the respective lighting device is on or off, because this information could not be obtained using the first wireless communication protocol and was not included in the information received using the second wireless communication protocol.

A third embodiment of the method is shown in FIG. 10. A step 151 comprises an electronic device receiving a broadcast from a further electronic device in a wireless network via second wireless communication protocol. The further electronic device is determined to be reachable using the second wireless communication protocol upon receipt of this broadcast. The response comprises information indicating whether the further electronic device is reachable using the first wireless communication protocol.

Step 153 comprises determining a value which represents a measure of proximity between the electronic device and the further electronic device based on the broadcast. The value may be an indicator of the strength with which the broadcast is received (i.e. RSSI) or may be determined based on this RSSI, for example. The value may be determined using input from other devices. For example, if a mobile device determines RSSI_A from lamp A, RSSI_B from lamp B, and RSSI_C from lamp C based on own RSSI measurements, and the lamps also do cross-RSSI measurements and provide these measurements to the mobile device (so the mobile devices receives RSSI_A_from_B, RSSI_B_from_A, etc.), the mobile device may be able to discard certain false positives, particularly when the mobile device is in close proximity to multiple lamps.

The determined value, e.g. RSSI, is compared with a threshold in step 155. If the measure of proximity is smaller than a certain threshold, e.g. the RSSI value is larger than a minimum RSSI, then step 157 is performed next.

Step 157 comprises providing an indication of a status of the further electronic device based on the reachability of the further electronic device using the first wireless communication protocol and the reachability of the further electronic device using the second wireless communication protocol. In the embodiment of FIG. 10, the indication comprises a notification that is provided upon determining that the measure of proximity is smaller than the certain threshold. Thus, step 157 is only performed if the measure of proximity is smaller than the certain threshold.

Figure 11:
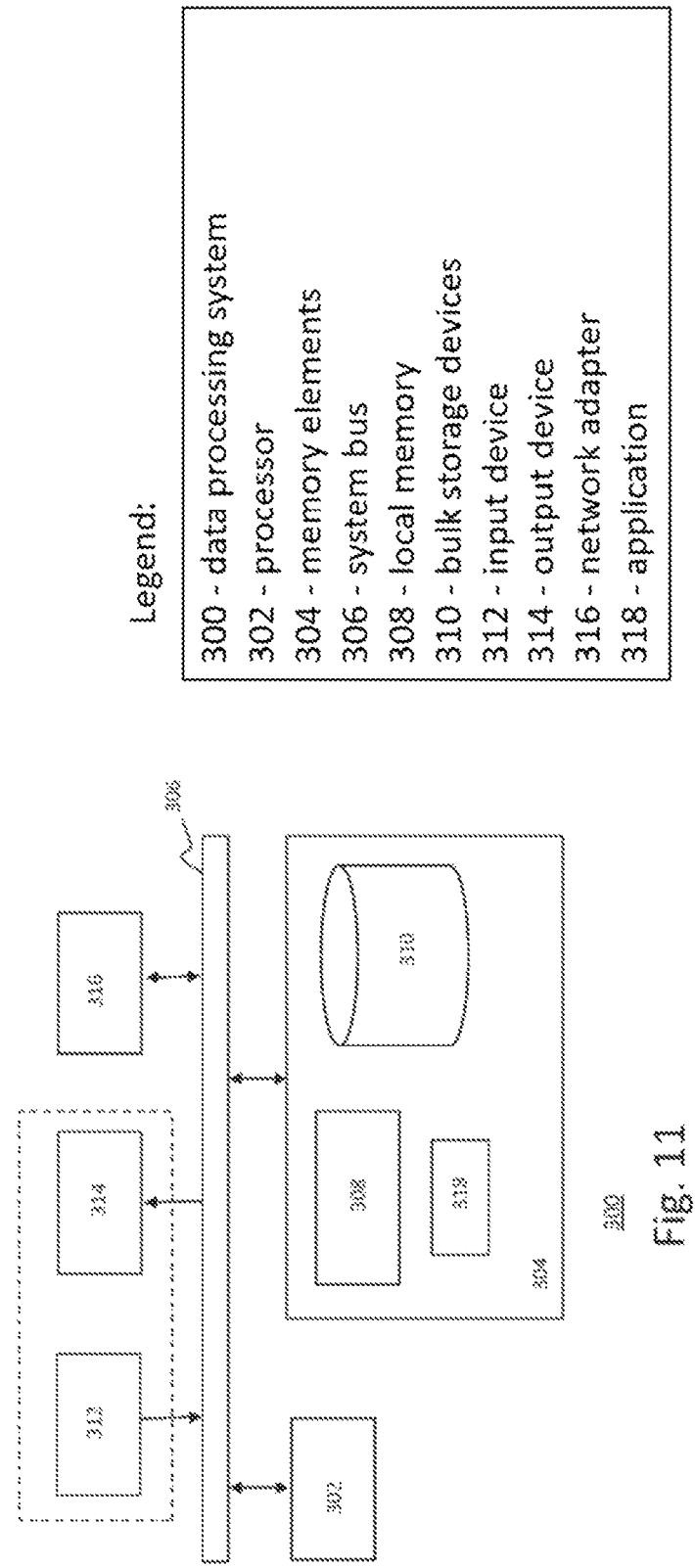
FIG. 11 is a block diagram of an exemplary data processing system for performing the method of the invention.

FIG. 11 depicts a block diagram illustrating an exemplary data processing system that may perform the method as described with reference to FIGS. 3, 4 and 10.

As shown in FIG. 11, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 11, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device for determining a reachability of a further electronic device over a wireless connection, said further electronic device being part of a wireless network, said electronic device comprising:
   at least one input interface;
   at least one output interface; and
   at least one processor configured to:
   determine, via said at least one input interface, whether said further electronic device is reachable using a first wireless communication protocol,
   determine, via said at least one input interface, whether said further electronic device is reachable using a second wireless communication protocol,
   provide, via said at least one output interface, an indication of a status of said further electronic device based on said reachability of said further electronic device using said first wireless communication protocol and said reachability of said further electronic device using said second wireless communication protocol, and
   transmit, via said at least one output interface, a test message to said further electronic device using said first wireless communication protocol and determine, via said at least one input interface, that said further electronic device is reachable using said first wireless communication protocol upon receipt of a transmission in response to said test message.

2. An electronic device as claimed in claim 1, wherein said at least one processor is configured to use said at least one output interface to transmit said test message to said further electronic device using said first wireless communication protocol via a network device in said wireless network.

3. An electronic device as claimed in claim 1, wherein said at least one processor is configured to use said at least one input interface to determine that said further electronic device is reachable using said second wireless communication protocol upon receipt of a broadcast which uses said second wireless communication protocol from said further electronic device.

4. An electronic device as claimed in claim 1, wherein said at least one processor is configured to use said at least one input interface to receive information from said further electronic device using said second wireless communication protocol, said information indicating how said further electronic device can be reached using said first wireless communication protocol.

5. An electronic device as claimed in claim 1, wherein said at least one processor is configured to use said at least one input interface to receive information from said further electronic device using said second wireless communication protocol, said information indicating whether said further electronic device is reachable using said first wireless communication protocol.

6. An electronic device as claimed in claim 1, wherein said first wireless communication protocol is Zigbee and/or said second wireless communication protocol is Bluetooth.

7. An electronic device as claimed in claim 1, wherein said at least one processor is configured to:
   determine a value which represents a measure of proximity between said electronic device and said further electronic device; and
   provide said indication in dependence on said measure of proximity being smaller than a certain threshold.

8. An electronic device as claimed in claim 7, wherein said at least one processor is configured to provide said indication by providing a notification upon determining that said measure of proximity is smaller than said certain threshold.

9. An electronic device as claimed in claim 1, wherein said at least one processor is configured to use said at least one output interface to provide said indication via a display, via an audio output and/or via haptic feedback.

10. An electronic device as claimed in claim 1, wherein said at least one processor is configured to use said at least one output interface to provide an indication of one or more other electronic devices having a similar or same status as said further electronic device.

11. An electronic device as claimed in claim 1, wherein said at least one processor is configured to use said at least one output interface to transmit a configuration message to said further electronic device over said second wireless communication protocol upon determining that said further electronic device is unreachable over said first wireless communication protocol.

12. A method of determining a reachability of an electronic device over a wireless connection, said electronic device being part of a wireless network, said method comprising:

determining, by a processor, whether said electronic device is reachable using a first wireless communication protocol;

determining, by the processor, whether said electronic device is reachable using a second wireless communication protocol; and providing, on a display, an indication of a status of said electronic device based on said reachability of said electronic device using said first wireless communication protocol and said reachability of said electronic device using said second wireless communication protocol, wherein said determining, by the processor, whether said electronic device is reachable using a first wireless communication protocol comprises transmitting, via a transmitter, a test message to said electronic device using said first wireless communication protocol and determining, by the processor, that said electronic device is reachable using said first wireless communication protocol upon receipt, via a receiver, of a transmission in response to said test message.

13. A non-transitory computer-readable medium storing computer program or suite of computer programs comprising at least one software code portion or a computer program product comprising a non-transitory computer-readable medium storing the at least one software code portion, the transitory software code portion, when executed by one or more processors, performs the method of claim 12.

\* \* \* \* \*